United States Patent [19]
Kugelmann, Sr.

[11] Patent Number: 5,492,390
[45] Date of Patent: Feb. 20, 1996

[54] VARIABLE SHAPED WHEEL

[75] Inventor: Franz J. Kugelmann, Sr., Juneau, Ak.

[73] Assignee: Nudvuck Enterprises, Juneau, Ak.

[21] Appl. No.: 230,222

[22] Filed: Apr. 20, 1994

[51] Int. Cl.$^6$ .................................................. B60B 1/00
[52] U.S. Cl. ................... 301/5.1; 305/6; 305/60
[58] Field of Search ................... 301/5.1, 1, 104; 305/4, 5, 6, 7, 15, 19, 60; 242/571, 577, 577.1, 577.2, 577.3; 474/47, 49, 50, 51

[56] References Cited

U.S. PATENT DOCUMENTS

| | | |
|---|---|---|
| 1,079,082 | 11/1913 | Wells . |
| 1,416,078 | 5/1922 | Taylor . |
| 1,946,787 | 2/1934 | Feinbergs ................... 301/12 |
| 2,786,540 | 3/1957 | Sfredda ................... 180/22 |
| 3,370,889 | 2/1968 | Tucker ................... 301/41 |
| 3,459,454 | 8/1969 | Liston ................... 301/5 |
| 3,802,743 | 4/1974 | Hermanns ................... 301/5 R |
| 4,046,339 | 9/1977 | Stancliffe ................... 244/103 R |

FOREIGN PATENT DOCUMENTS

| | | | |
|---|---|---|---|
| 4011011 | 10/1991 | Germany ................... 474/51 |
| 626992 | 8/1978 | U.S.S.R. ................... 152/5 |
| 620719 | 8/1978 | U.S.S.R. ................... 474/51 |
| 929467 | 5/1982 | U.S.S.R. ................... 301/5.1 |
| 1079468 | 3/1984 | U.S.S.R. ................... 301/5.1 |
| 1088955 | 4/1985 | U.S.S.R. ................... 301/5.1 |
| 1415612 | 12/1990 | U.S.S.R. ................... 301/5.1 |
| 1772479 | 10/1992 | U.S.S.R. ................... 474/51 |

*Primary Examiner*—Russell D. Stormer

[57] ABSTRACT

A variable shaped wheel having a hub, a plurality of extendable ram rods connecting the hub and shape adaptable rim. Extension and retraction of the ram rods cause the rim to harmonize to a selected wheel shape such as horizontal oval, vertical oval, elliptical, tractor like and numerous other shapes, when stationary and while moving. The selected shape of the variable wheel in motion is maintained by continual length adjustment of the ram rods. The variable shaped wheel adjusts to the most effective, efficient shape for travel over varying surfaces such as asphalt, concrete, sand, mud, rock, snow, ice and others, providing optimum speed and comfort. It is another purpose of the present invention, through change in shape of the variable wheel, pulley, gear from conventional circular to oval, elliptical, and shapes other than circular, to make contact at the periphery along the elongated axis with another wheel, pulley, gear, providing for simple and effective rotational energy transmission from one wheel, pulley, gear, to another.

9 Claims, 6 Drawing Sheets

VARIABLE SHAPED WHEEL

TECHNICAL FIELD

This invention relates generally to the wheel, and more particularly concerns the wheel, pulley, and gear, which can alter shape from traditional circular to oval, elliptical, tractor like, and multitudes of other shapes, and return to its original traditional circular shape, all this when stationary or while moving in rotational motion.

BACKGROUND ART

The wheel is an ancient device dating back from 3500 to 3000 B.C. and has been used for many purposes such as carts, potters wheel, spinning wheel, water wheel, windmill, pulley, gears, the vehicular wheel on bicycles, motorcycles, cars, trains, trailers, and other vehicles of all types. There are many types of wheels, large, small, thick, thin, round, square, rectangular, elliptical, and oval. The most used wheel configuration is circular, but other shapes are in use.

One of the primary limitations of the conventional wheel is that it is designed for the efficient use for travel on a particular surface at a specific speed range where upon moving onto another type of surface, speed, smoothness of riding across, and the efficiency of the common wheel drops considerably or, on many occasions it will be of no use whatsoever. For example: the wheel of a racing car is designed for high speed, with minimal road contact on straight runs, but enough contact for having adequate friction to make controlled high speed turns on curves. The road surface on which the race car rides is generally relatively smooth and hard, such as asphalt and concrete. As the race car is driven onto a differing surface, such as a soft dirt road or rocky country road, the very efficient wheel of the race car suddenly becomes a burden, very inefficient, even unstable, unless exchange to off-road wheels are made to adapt to the new surface conditions. Similarly, the wheels of an off-road vehicle are excellent for an off-road environment such as a soft, sandy, or gravely surface. Driving onto a hard, smooth, road surface however, the off-road wheels become a liability, preventing high road speed and providing a bumpy ride.

Unique improvements have been sought and found, some with excellent features. U.S. Pat. No. 3,459,454 discloses an elliptical wheel having excellent shape characteristics for riding over a soft media surface. U.S. Pat. No. 3,620,278 is another example of a distinguished wheel featuring some configuration variability to broaden the wheel footprint on the ground surface to increase traction. There remains, however, a need for other wheels possessing the flexibility to provide superb riding conditions even as terrain conditions vary severely. This invention overcomes this handicap eloquently. As terrain conditions change, adjust the wheel to one of multiple available shapes applicable for maximum efficiency and smooth riding for each distinctive surface condition.

Other purposes of the wheel in form of pulley and gears is to transmit rotational power from one shaft to another, from one gear to another, from one pulley to another, or to transmit rotational power through use of belts, chains, or similar power transmission extensions.

DISCLOSURE OF THE INVENTION

It is the object of the present invention to provide wheels for vehicular travel where the wheels shape can be changed to provide small area or large area surface contact for control of traction and contact pressure between the wheels and the surface traveled upon. This is maximized by having the flexibility to change the shape of the wheel at any time, when stationary or in motion, from common circular to elliptical, oval, tractor like, a multitude of shapes, as terrain conditions impose. The numerable possible shapes of the wheel are composed through extension and retraction of radial ram rods extending from the wheel center hub placing pressure onto the moderately flexible constant length wheel rim and shaping the rim to the desired wheel configuration. As the wheel is stationary, each ram rod extends or retracts to its required length and then stays constant at that specific length. After the wheel is set into motion, it requires a continuous length adjustment of each ram rod to keep the shape of the wheel constant. This continuous ram rod length adjustment is required for all shapes when the wheel is in motion, except for the common circular shape of the wheel. The conversion of conventional circular shaped wheel into a multitude of other wheel shapes by extension and retraction of radial ram rods is managed and directed by a computer processor, where the exact location information of one or more ram rods respective to wheel, vehicle, ground surface is referenced and communicated to the processor, which consequently determines each ram rod length for its specific location on the wheel in agreement with the selected wheel configuration. Simultaneously, the computer processor combines instant wheel speed information with each ram rod location information and pending on the wheel shape selected, determines and directs each ram rod to extend at a specific rate, stay constant in length, or retract at a specific rate to keep the perfect selected wheel shape of the rim.

It is another object of the present invention to provide wheels for vehicular travel where through the change in shape of the wheels from conventional circular to horizontal oval the vehicle can be lowered, or to vertical oval the vehicle can be raised, respective to the traveled on surface.

A further object of the present invention is that innumerable shapes of the wheel can be composed as long as there is harmony between the constant length rim and spoke length.

It is also the objective of the present invention, where the wheel, whether it is smooth like a pulley, with gear-like teeth or other wheel rim surface, through change in its shape from conventional circular to elongated oval, elliptical or other arched elongated configuration, will engage at its elongated side another wheel, pulley or gear, for rotational power transmission, without moving the power transmitting rotating shaft. This simple power engagement with transmission of rotational power is applicable to any rotating shaft of gear train machinery like lathes, mills, including cars using no clutch or complex automatic transmission. Disengagement is accomplished when returning the wheel, pulley or gear to the common circular shape.

Another purpose of the present invention is that upon contact between long straight sides of two oval or tractor like shaped wheels, gear like wheels or pulleys, more power can be transmitted between them than with conventional power trains since a much larger area of power transmission contact can be achieved through geometrically shaped wheel configurations other than the conventional circular.

It is yet another objective of the present invention to lower or heighten the top and bottom of a gear sprocket or pulley of chain or belt drive system to keep the belt or chain at a certain height out of harms way, so not to interfere with other items, all this without any change in gear/wheel ratio.

DETAILED DESCRIPTION OF THE INVENTION

Figure 1:
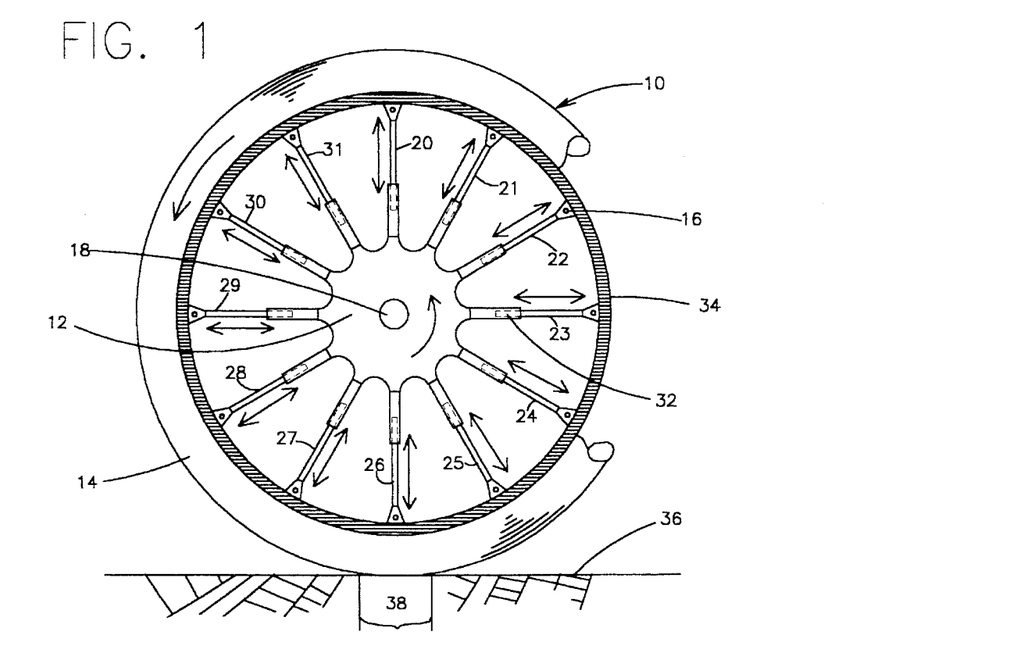
FIG. 1 is the view of the variable shaped wheel in conventional circular configuration of the present invention.
Figure 2:
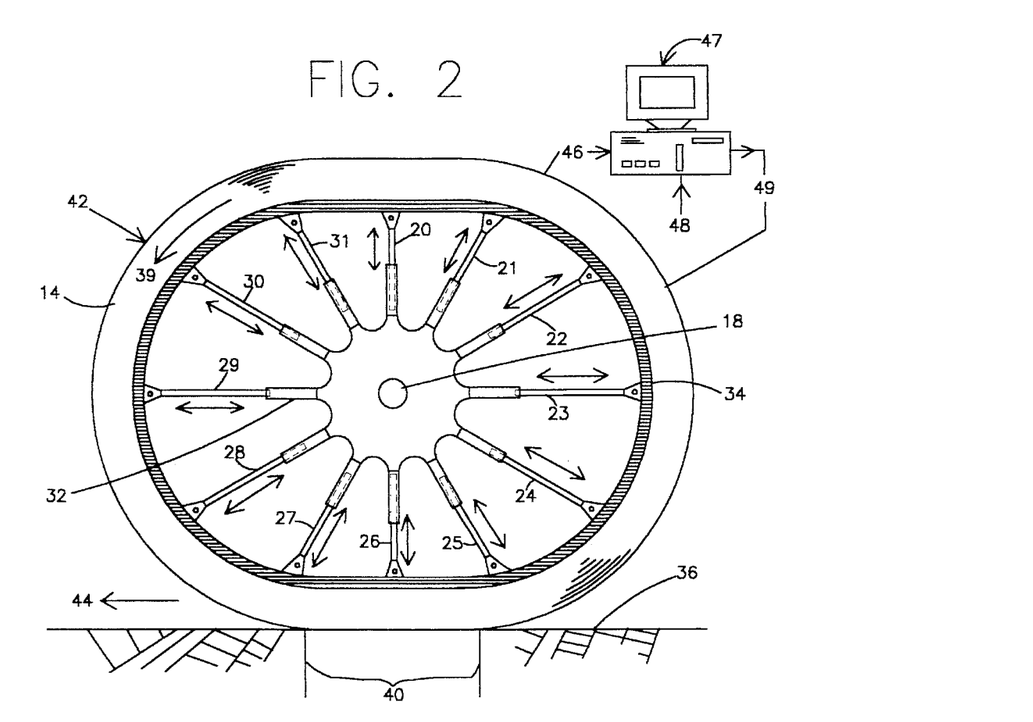
FIG. 2 shows one of the multitudes of configurations of the variable shaped wheel, namely that of the horizontal oval shape.
Figure 3:
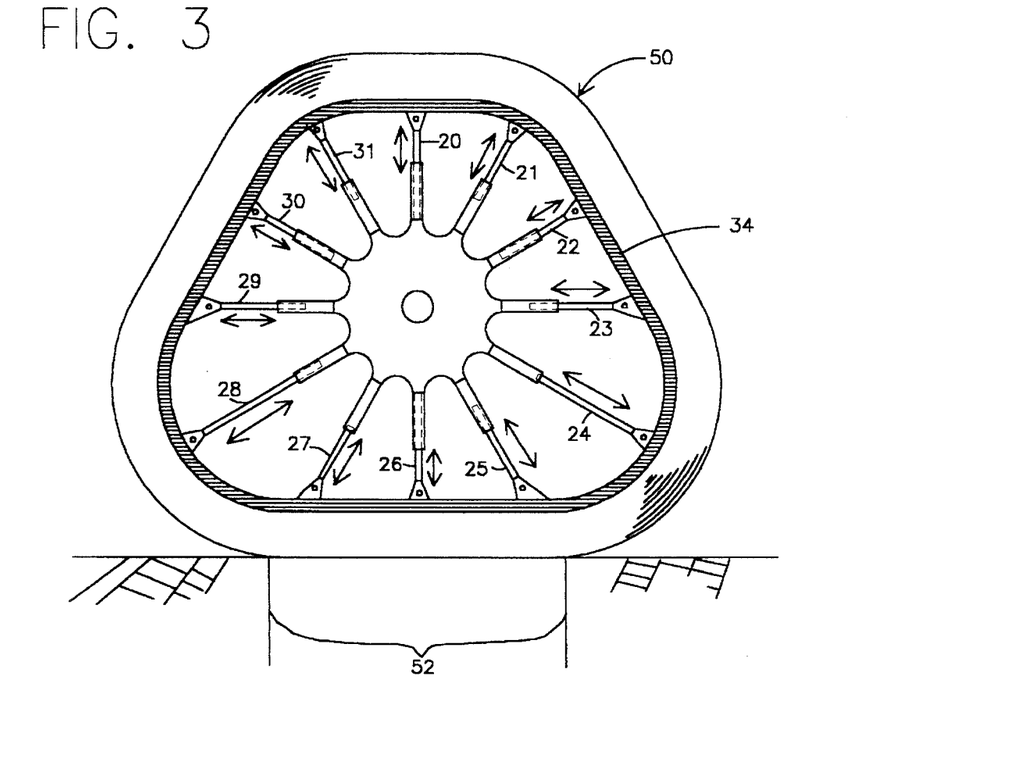
FIG. 3 shows another variation of shapes of the variable shaped wheel, resembling a tractor like configuration.

FIGS. 1–3 show several configurations of the embodiment of variable shaped wheel of the present invention. Although the embodiments shown in FIGS. 1–3 have relative defined shapes, it should be understood that the embodiment of the variable shaped wheel may have numerable other shapes pending on the combination of extended lengths of ram rods. FIGS. 4–10 show other application of the present invention.

Referring to the drawing in particular, the invention embodied therein in FIG. 1 comprises of wheel 10 which is constructed with selection to change to other configurations in accordance with the invention. Shown in conventional circular shape, wheel 10 includes a rotational power transmission member 18 with hub 12 secured to it, from which in a radial fashion, a multitude of variable length extending and retracting ram rods 20–31 move within guides 32, mounted on or as part of a continuance to hub 12. Instead of single acting ram rods, multiple part extension ram rods can be used for longer range application. Extension of ram rods 20–31 is accomplished through hydraulic, electrical, mechanical, pneumatic mean or combinations thereof. The extend of extension, retraction, non-movement for each ram rod 20–31 is determined, controlled and directed by computer as elaborated on in more specific terms later. Although twelve ram rods 20–31 are shown in FIG. 1, fewer or more may be used depending on specific applications and wheel size. Ram rods 20–31 are connected to the constant length rim 34 by pin 16. Other non-rigid connection can be used. In the embodiment shown, rim 34 is traditional, circularly shaped as consequence of having ram rods 20–31 of same length extended from guides 32. As will be shown later, ram rods 20–31 when extended, retracted or not moved laterally, individually or in groups, will cause, if in harmony with rim 34, wheel 10 to change in shape. The exception to this is well known, the common circular wheel 10 where all ram rods 20–31 are of the same constant length. For rim 34 to change shape but at the same time be able to withstand loads on wheel 10, it must consist of material which is strong, flexible but rigid enough between ram rods 20–31 to support heavy loads. Change in shape of rim 34 must be limited to the materials elastic deformation limits, outside the plastic deformation range. Mounted onto rim 34 is compliant tire 14. As tire 14 contacts the ground 36, a footprint 38 for the circular shaped wheel 10 is established. The footprint 38 for a circular shaped wheel 10 is relatively small and has therefore limited application for travel on soft and rocky surfaces and other application explained later.

In the particular embodiment of FIG. 2, the circular wheel 10 of FIG. 1 has been reconfigured to horizontal oval shaped wheel 42. This change of shape is being accomplished by extension in length of ram rods 23 and 29 to the longest, ram rods 24 and 28 slightly shorter, ram rods 25 and 27 shorter again, with shortest ram rod 26 at the bottom center of horizontal oval shape wheel 42. The upper half of the oval configured wheel 42 is a reflection in uniformity of the bottom half of the oval configured wheel 42. As the power transmission member 18 rotates counter clockwise thus rotating all of oval wheel 42, all ram rods adjust continually in length to keep the horizontal oval shape of wheel 42. For example: as oval wheel 42 is in couter clockwise rotating motion 39, ram rod 29, one of the longest, is moving towards the position of ram rod 28, and is then becoming ram rod 28. During this transition phase, ram rod 29 is gradually retracted into guide 32 until reaching the extended length of ram rod 28. The rate or speed of retraction of ram rod 29 from the position shown in FIG. 2 and moving until it becomes ram rod 28 is determined and directed through computerized means 47, based on the oval configured wheel 42 velocity. This is being accomplished as follows: A sensory system determines the location of one or more ram rods with respect to wheel 42, ground 36 and the motion is it in, forward shown as counter clockwise on FIG. 2, backward or not moving at all. This information is transmitted through input 46 to computer means 47. Program 48 with input information of wheel 42 oval configuration and components thereof, performs in conjunction with computer means 47, calculations using complied data input 46 and other information such as wheel 42 velocity, relative vehicle speed, ground speed, soil conditions and other relevant data, to determine the required rate of retraction, required rate of extension, or no movement, and length of each ram rod for each minute incremental rotational unit. This direction giving information output 49 is then transmitted to each ram rod 20–31, responding to the directive with corresponding retraction, extension, or no movement. Program 48 containing information for each wheel configuration and also for transformation phase from one wheel shape to another may be selected by manual means such as selection by a driver of a vehicle or by automatic means such as input from condition of road traveled which then the most efficient wheel shape is determined and selected. So, oval configured wheel 42 rotates counter clockwise 39, ram rod 28 is moving towards the position of ram rod 27. During this transition, ram rod 28 is gradually retracted until reaching extended length of ram rod 27 is gradually retracting in length until reaching extended length of ram rod 26. During the same rotational movement of wheel 42 ram rod 26 is moving towards the position of ram rod 25. During this transition, ram rod 26 is gradually extending in length until reaching extended length of ram rod 25. All other ram rods adjust in a similar manner as described beforehand. As long as oval wheeled configuration is rotating, all ram rods simultaneously and continually adjust by extending or retracting lengths in a fashion so that the ram rod ends follow the oval shape of rim 34. It should be understood from the previous discussion, that the extending, retracting ram rods form the oval shape of the rim 34. The rim does not determine shape as on a conventional wheel but conforms to the shaping of the ram rods 20–31. Due to the specific horizontal oval shape on wheel 42, the ground surface contact 40 is many fold in area compared with conventional circular configured wheel 10 ground surface contact 38 of FIG. 1. Large ground contact area becomes important when the wheel of a vehicle is on soft and spongy soil such as sand or mud. The defeat of the German Army in Russia during World War II can be partially attributed to the high unit load by German vehicles on the soft and muddy Russian roads, getting stuck, where as the Russians vehicles, especially Russian tanks with low per square foot loading on the soil succeeded in overcoming such handicapped. The present invention will provide the advantage of distributing the loading on the soil so that soft and muddy soil can be traveled over without getting stuck, which would normally not be passable by vehicles with conventional wheels. In addition, the larger contact area between wheel and the ground provides the great advantage of added friction when trying to climb a snow and ice covered hill during the winter time. Another feature of wheel 42 is that through change in shape to horizontal oval, the axle on a vehicle will be lowered, lowering the vehicle, making access into and out of it much easier. This is especially an attractive feature on vehicles serving small children, older adults and the handicapped people.

Figure 4:
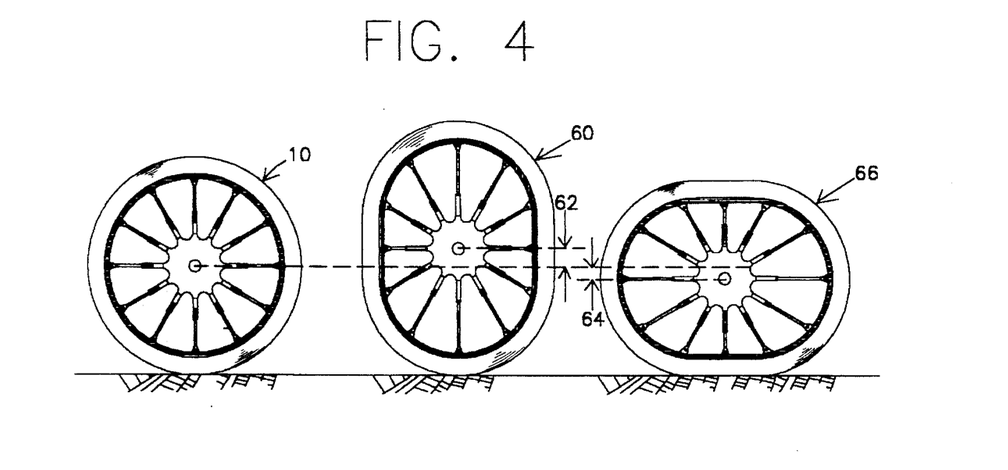
FIG. 4 depicts the change of the variable shaped wheel of normal circular convention into that of an elongated vertical oval and elongated horizontal oval configuration.

FIG. 3 shows another embodiment of the present invention which is another variation in configuration in form of a tractor shaped wheel 50, providing even larger ground surface contact 52. This particular wheel shape is especially adaptable to construction and farm machinery such as backhoes, farm tractors, trailers and the like, preventing them from getting stuck in the soft farm field or muddy construction site. It is also an advantage when used on tractor like vehicles where low load distribution onto the ground surface is essential but with the added advantage to drive on common highways without damage to them and conforming to the commonly high speed traffic. It should also be understood that numerous other shaped wheel configurations are possible including elliptical, square and rectangular but round edged, non-uniform, with limitations only imposed upon by the range of length of extension and retraction of ram rods 20–31 and harmonious conformation of wheel rim 34. In FIG. 4, the conventionally round shaped wheel 10 is reconfigured to an elongated vertically oval shaped wheel 60 and elongated horizontally oval shaped wheel 66. Reconfiguration 60 provides the advantage of axle elevation 62 and thus raises any vehicle upon which the axle is mounted. This provides more clearance with the ground surface which is very useful when fording streams, crossing muddy roads, driving through deep snow, without getting wet or getting trapped. Reconfiguration 66 provides the advantage of axle height decrease 64 of any vehicle upon which the axle is mounted. This provides easier access onto a vehicle which is especially helpful to handicapped and older people. It also lowers a vehicle to pass under a low overpass.

Figure 5:
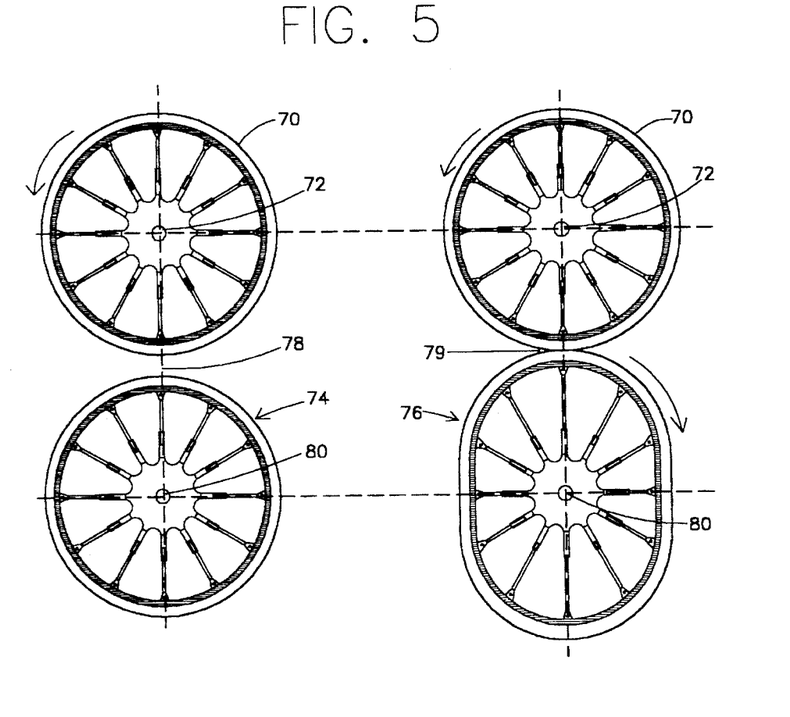
FIG. 5 is the side elevation view of two non-engaged variable shaped wheels or pulleys and the same wheels after one changed in configuration to higher vertical profile for power transmission contact.
Figure 6:
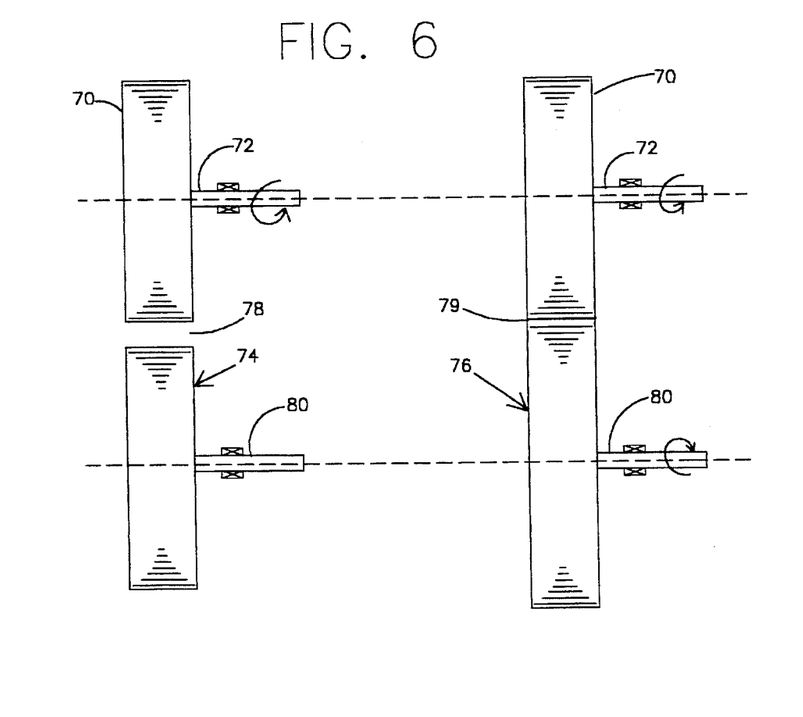
FIG. 6 is the side view of FIG. 5 showing two non-engaged variable shaped wheels with one rotating drive shaft and non-rotating second wheel shaft and the same wheels after one changed configuration for contact engagement, resulting in both shafts rotation.

FIGS. 5 & 6 (a front view of FIG. 5) show a further embodiment of the invention. Round shaped wheel pulley 70 is rotated counterclockwise by drive 72. Conventionally circular-shaped wheel pulley 74 is in no-contact 78 with rotating wheel pulley 70 and is therefore stationary. As the normally round shaped wheel pulley 74 is reforming to vertical oval shape wheel pulley 76, contact is made between round shaped wheel pulley 70 and vertical oval shaped wheel pulley 76 at point 79. Rotational power of pulley 70 is transmitted at point of contact 79, providing clockwise rotational power to shaft 80. Upon changing vertical oval shaped wheel pulley 76 back to its original conventionally circular shaped wheel pulley 74, disengagement of rotational motion of shaft 80 occurs. As can be shown, upon change in shape of circular to oval and back to circular, a simple transmission of power from one drive to another results.

This is also accomplished by change of the common circular pulley form to elliptical and any other form differing from the common circular. The wheel pulley can also be of other patterns such as gears and the like. This simple power transmission can be used for application on vehicles of all types, industrial power machinery, tools, any machinery requiring engagement and disengagement of rotational power.

Figure 7:
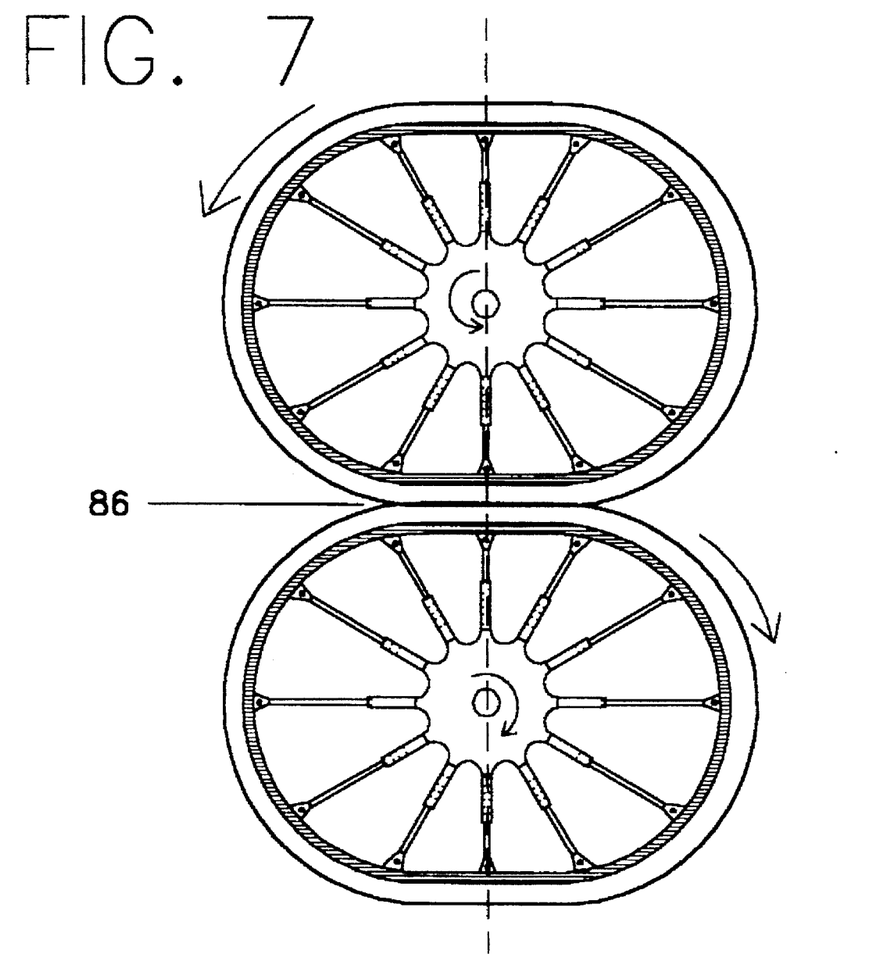
FIG. 7 are two contact engaged horizontally long oval variable shaped wheels.

FIG. 7 shows the large area of contact 86 for power transmission between two wheels where the large contact area provides large rotational power transfer from one to another. Normal contact for power transfer between conventional circular wheels, pulleys, gears are very small in area, thus limiting power transmission from one drive to another. This handicap is overcome by exacting large surface contact areas, providing large power transmission without failure.

Figure 8:
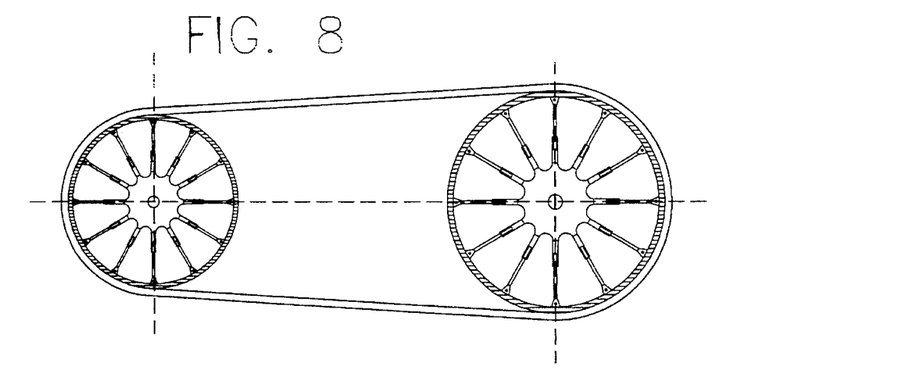
FIG. 8 is a conventional circular configured variable shaped wheel pulley belt/chain system.
Figure 9:
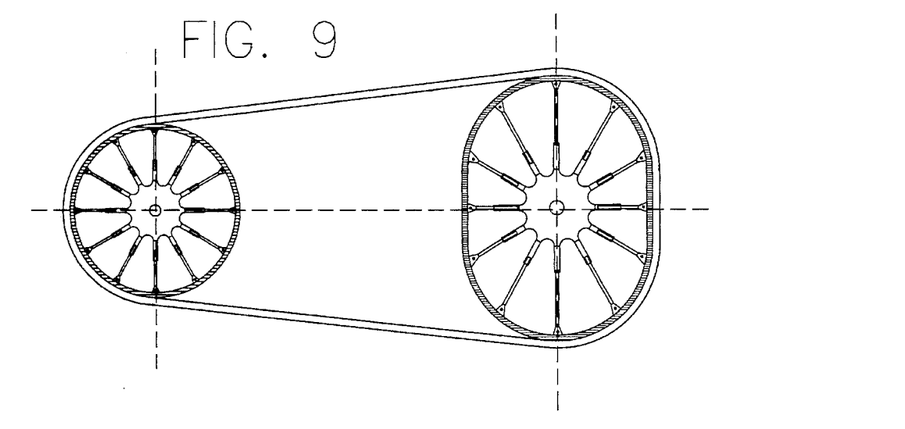
FIG. 9 is the variation from FIG. 7 by changing shape of one variable shaped wheel/pulley to a vertically long oval configuration.
Figure 10:
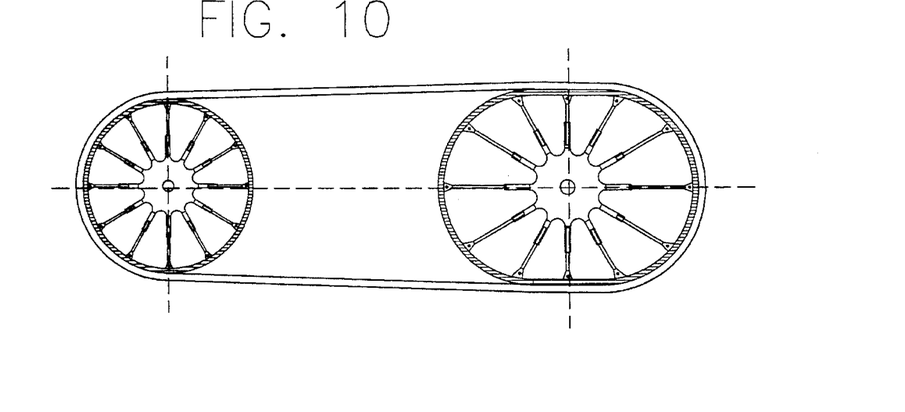
FIG. 10 is the variation from FIG. 7 by changing shape of one variable shaped wheel to a horizontally long oval configuration.
Figure 11:
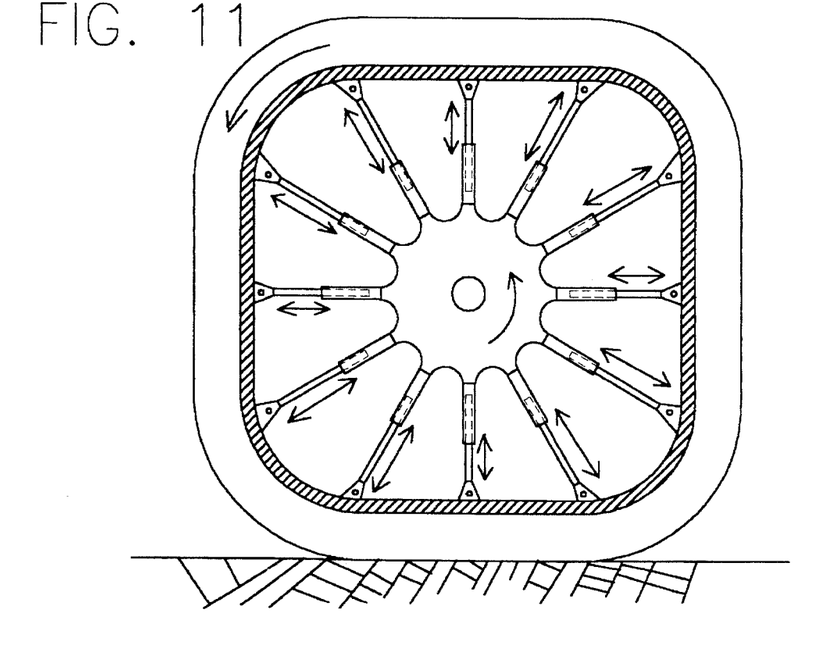
FIG. 11 shows the wheel in its square or rectangular configuration.
Figure 12:
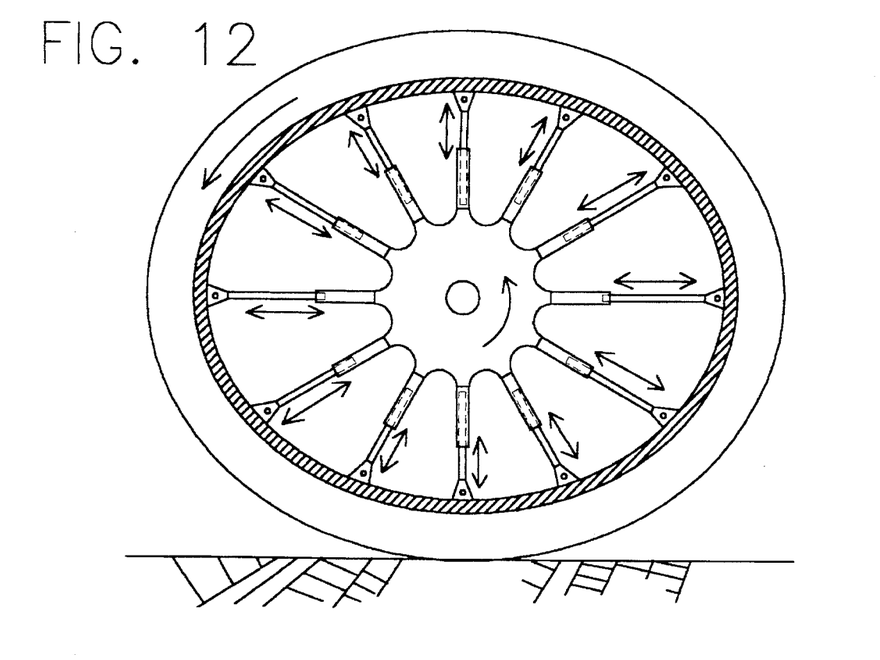
FIG. 12 shows the wheel in its oval configuration.

FIGS. 8, 9, 10 show belt or chain driven wheels, gear sprockets or pulleys where the change in configuration provides spacial advantages. FIG. 8 shows a conventional power transfer from one wheel to another. FIG. 9 shows a change of shape of one wheel to vertical oval with the result of having the power transmission belt raised at a higher slope, providing extra space in between the belts. This can be of great advantage to bring the belts outside an area where it would interfere without change in power transmission ratio. In FIG. 9 the belts show upper and lower sections where they are spread apart to provide extra space in-between, the belts upper and lower portion shown in FIG. 10 were put closer together by change in one wheel shape to horizontal oval, again without changing the power transmission ratio. The low profile in FIG. 10 will be especially advantageous on machinery where space is at a premium.

A new variable shaped wheel and application thereof have been described and shown. The alteration in configuration of a vehicular wheel when variable traveling surface conditions are encountered is of utmost importance and most of us have experienced getting trapped on a muddy, sandy, silty street, on a snowy hill or on a flooded plane and hoping to have the means on the vehicle to elude entrapment. The present invention provides the mode to do so and more, by being able to change shape of the variable wheel when moving or when stationary. Another most important feature of many others is the ease and simplicity at which through change in shape of the variable wheel, gear or pulley to oval, elliptical, or any other non-circular shape, power can be transmitted from one powered shaft to another un-powered shaft and then disengage by changing back to the conventional circular shape. The simplicity and flexibility of the present invention, the variable shaped wheel, to alter configuration to a variety of shapes and then return to its original shape, provides a flexibility to apply the most efficient, convenient, form for application encountered in industry and by the public on a daily basis, will save time and energy for vehicular travel, on power transmission systems, and other applications involving the conventional circular wheel, gear, or pulley.

While specific embodiments of the invention have been shown and delineated in detail to illustrate the application of the creative principles, it should be understood that various changes, modifications, and substitutions may be incorporated in the embodiments without departing from such principles.

I claim:

1. A variably shaped wheel comprising:

a hub at the center of the wheel;

a shape adaptable rim at the outer periphery of the wheel;

and a plurality of spokes extending between the hub and the rim, each spoke comprising an extendable and retractable ram rod;

each ram rod being independently extendable and retractable to form the rim into selected shapes other than circular, said shapes being maintained during rotation of the wheel by continual length adjustment of the individual ram rods.

2. A variable shaped wheel of claim 1 wherein said ram rods are independently extended and retracted by hydraulic, pneumatic, electrical, or mechanical means.

3. A variable shaped wheel of claim 1 wherein said rim is of constant circumference.

4. A variable shaped wheel of claim 1 wherein the length of extension and retraction and the rate thereof is controlled by computer means.

5. A variable shaped wheel of claim 1 wherein the change in shape from conventional circular to elongated configuration, elevates, and keeps the wheel axle elevated at height during wheel rotation when the elongation is in the vertical plane, and lowers, and keeps the wheel axle at lower level when the elongation is in the horizontal axis, whereby any vehicle mounted onto the axle will be able to rise to ford rivers and deep snow and lower to pass through underpasses and ease of access onto the vehicle.

6. A variable shaped wheel of claim 1 wherein the rate of said continual length adjusting ram rods is relative to the wheel rotational speed.

7. The variably shaped wheel of claim 1 wherein the selected shapes of the wheel include oval, elliptical, triangular, square, and rectangular configurations, with ram rod lengths in harmony with the rim at all times.

8. A wheel assembly comprising a pair of separated wheels, closely spaced periphery to periphery, with stationary but rotatable centerline axis, at least one of the wheels adaptable to various shapes and comprising a hub, a shape adaptable rim, and a plurality of ram rods extending between and connecting the rim and the hub, the ram rods extending and retracting to transform the rim from a circular shape to oval, elliptical, triangular, or rectangular with rounded corners, where upon the periphery along the elongated axis of selected wheel shape contracts the periphery of the other wheel for rotational power transfer from one wheel to the other.

9. A variable shaped wheel of claim 8 wherein both wheels are of variable shape with contact between the wheels along the elongated side of each periphery, whereby maximum rim to rim surface contact is attained for optimal rotational energy transfer.

* * * * *